US008364758B2

(12) United States Patent
Hydrie et al.

(10) Patent No.: US 8,364,758 B2
(45) Date of Patent: Jan. 29, 2013

(54) TOPOLOGY MANAGEMENT IN PEER-TO-PEER CONTENT DISTRIBUTION CLOUDS

(75) Inventors: Aamer Hydrie, Seattle, WA (US); Anders E. Klemets, Redmond, WA (US); Christos Gkantsidis, Cambridge (GB); John Miller, Cambridge (GB); Pablo Rodriguez Rodriguez, Barcelona (ES); Rebecca C. Weiss, Vienna, VA (US)

(73) Assignee: Microsoft Corporation, Redmond, WA (US)

( * ) Notice: Subject to any disclaimer, the term of this patent is extended or adjusted under 35 U.S.C. 154(b) by 147 days.

(21) Appl. No.: 12/279,823

(22) PCT Filed: Jan. 26, 2007

(86) PCT No.: PCT/US2007/002184
§ 371 (c)(1),
(2), (4) Date: Jan. 20, 2009

(87) PCT Pub. No.: WO2007/097877
PCT Pub. Date: Aug. 30, 2007

(65) Prior Publication Data
US 2009/0265473 A1 Oct. 22, 2009

(30) Foreign Application Priority Data
Feb. 21, 2006 (EP) .................................... 06270019

(51) Int. Cl.
*G06F 11/00* (2006.01)
*G06F 15/16* (2006.01)
*G06F 15/177* (2006.01)
*G06F 15/173* (2006.01)
*H04L 12/28* (2006.01)
*H04W 4/00* (2009.01)

(52) U.S. Cl. ........ 709/204; 709/201; 709/202; 709/203; 709/217; 709/218; 709/219; 709/220; 709/222; 709/223; 709/224; 709/225; 709/226; 370/228; 370/236; 370/254; 370/256; 370/338; 370/389; 370/392

(58) Field of Classification Search ........................ None
See application file for complete search history.

(56) References Cited

U.S. PATENT DOCUMENTS
6,345,297 B1   2/2002  Grimm et al.
(Continued)

FOREIGN PATENT DOCUMENTS
WO   WO2005051026   *  6/2005
WO   WO2006088403   *  11/2005

OTHER PUBLICATIONS

Chokkalingam et al, BitTorrent Protocol Specification, Dec. 12, 2004, Version 1.*

(Continued)

*Primary Examiner* — Ario Etienne
*Assistant Examiner* — Ho Shiu
(74) *Attorney, Agent, or Firm* — Lee & Hayes, PLLC (57) ABSTRACT

A topology management process is implemented in peer-to-peer content distribution clouds using tracker nodes. Tracker nodes have information about available peers and assist peers in finding other peers to connect to. Various algorithms for use at the tracker nodes are described for selecting which peers to return as potentials for forming connections to. In addition, architectures and algorithms to allow efficient scaling of tracker nodes in peer-to-peer clouds are described.

18 Claims, 9 Drawing Sheets

U.S. PATENT DOCUMENTS

| | | | |
|---|---|---|---|
| 6,678,728 B1* | 1/2004 | Uppunda et al. | 709/222 |
| 6,889,254 B1* | 5/2005 | Chandra et al. | 709/224 |
| 6,950,848 B1* | 9/2005 | Yousefi'zadeh | 709/203 |
| 7,835,286 B2* | 11/2010 | Verchere et al. | 370/238 |
| 2002/0156893 A1* | 10/2002 | Pouyoul et al. | 709/225 |
| 2002/0184311 A1* | 12/2002 | Traversat et al. | 709/204 |
| 2003/0101439 A1* | 5/2003 | Desoli et al. | 717/148 |
| 2004/0088369 A1* | 5/2004 | Yeager et al. | 709/217 |
| 2004/0162871 A1* | 8/2004 | Pabla et al. | 709/201 |
| 2004/0218573 A1* | 11/2004 | Takahashi et al. | 370/338 |
| 2004/0264385 A1 | 12/2004 | Hennessey et al. | |
| 2005/0060399 A1* | 3/2005 | Murakami et al. | 709/223 |
| 2005/0060406 A1* | 3/2005 | Zhang et al. | 709/225 |
| 2005/0152318 A1* | 7/2005 | Elbatt et al. | 370/338 |
| 2005/0163061 A1* | 7/2005 | Piercey et al. | 370/255 |
| 2006/0046664 A1* | 3/2006 | Paradiso et al. | 455/96 |
| 2006/0077909 A1* | 4/2006 | Saleh et al. | 370/254 |
| 2006/0101340 A1* | 5/2006 | Sridhar et al. | 715/734 |
| 2006/0126611 A1* | 6/2006 | Kelly et al. | 370/389 |
| 2006/0168111 A1* | 7/2006 | Gidwani | 709/218 |
| 2006/0215582 A1* | 9/2006 | Castagnoli et al. | 370/254 |
| 2006/0215583 A1* | 9/2006 | Castagnoli | 370/254 |
| 2007/0025353 A1* | 2/2007 | Nambisan et al. | 370/392 |
| 2007/0028133 A1* | 2/2007 | Izutsu et al. | 714/4 |
| 2007/0110009 A1* | 5/2007 | Bachmann et al. | 370/338 |
| 2007/0178908 A1* | 8/2007 | Doyle | 455/456.1 |
| 2008/0261580 A1* | 10/2008 | Wallentin et al. | 455/418 |
| 2008/0291822 A1* | 11/2008 | Farkas et al. | 370/216 |
| 2010/0235432 A1* | 9/2010 | Trojer | 709/203 |

OTHER PUBLICATIONS

Dave et al, Content Distribution Using an Enhanced BitTorrent System, Spring 2004,.*

Qui et al, Modeling and Performance Analysis of BitTorrent-Like Peer-to-Peer Networks, 2004, pp. 367-377.*

Cohen, "Incentives Build Robustness in BitTorrent", Inet. Annual Internet Society Conference, May 22, 2003, pp. 1-5.

Li, et al., "Research of Peer-to-Peer Network Architecture", Communication Technology Proceedings, 2003. ICCT 2003. International Conference on Apr. 9-11, 2003, Piscataway, NJ, USA, IEEE, vol. 1, pp. 312-315.

Qureshi, "Exploring Proximity Based Peer Selection in a BitTorrent-like Protocol". May, 7, 2004, retrieved on Jul. 11, 2005 at <<http://pdos.csail.mit.edu/6.824-2004/reports/asfandyar.pdf>>, pp. 1-10.

* cited by examiner

TOPOLOGY MANAGEMENT IN PEER-TO-PEER CONTENT DISTRIBUTION CLOUDS

RELATED APPLICATIONS

This application is a National Stage of International Application No. PCT/US2007/002184, filed 26 Jan. 2007, which claims priority from European Patent Application No. 06270019.0, filed on 21 Feb. 2006. Both applications are incorporated herein by reference.

TECHNICAL FIELD

This description relates generally to peer-to-peer content distribution and more specifically to topology management in peer-to-peer content distribution clouds. The description is particularly concerned with, but in no way limited to, using algorithms at registrar nodes to manage peer-to-peer cloud shape.

BACKGROUND

Topology management in peer-to-peer file sharing clouds is a significant problem that needs to be addressed in order to increase the speed and ease with which all or most members of the cloud can receive content being shared.

Figure 1:
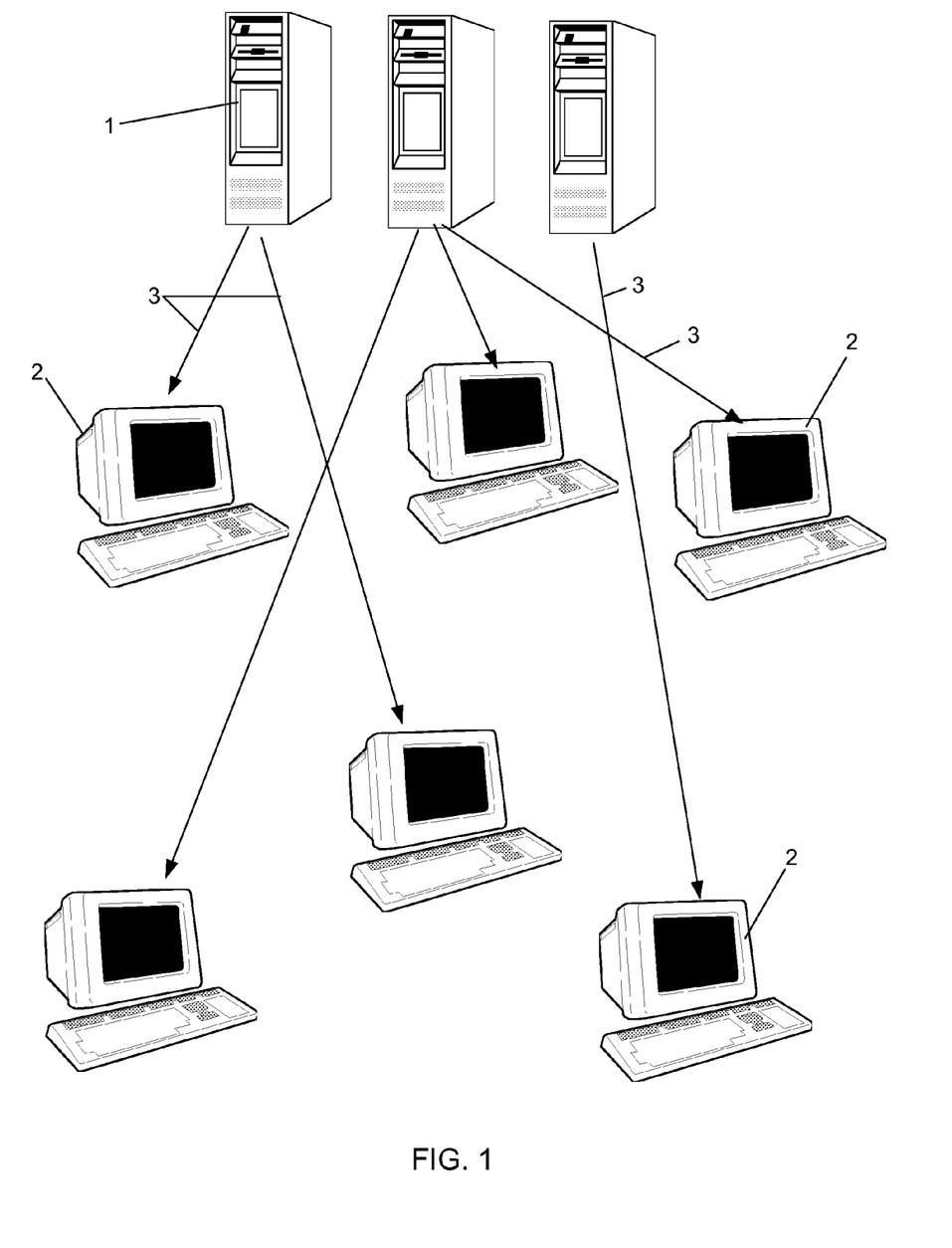
FIG. 1 is a schematic diagram of a prior art content distribution system using a server farm.

In the past, large scale content distribution has been carried out using dedicated server farms providing infrastructure-based solutions. In this type of method, each client requiring content forms a dedicated high bandwidth connection to a server at a server farm and downloads content as required. This type of solution is costly for the content provider who must provide and maintain the server farm. FIG. 1 illustrates this type of solution having servers 1 and clients 2, each client having direct connections to one or more servers. Not only is this type of solution costly for content providers but it is not robust in that failure at a server prevents content from being provided to many clients. In addition, the solution is not easily scalable because each server supports a limited number of clients.

More recently a new paradigm for content distribution has emerged based on a distributed architecture using a co-operative network in which nodes share their resources (storage, CPU, bandwidth).

Cooperative content distribution solutions are inherently self-scalable, in that the bandwidth capacity of the system increases as more nodes arrive: each new node requests service from, and, at the same time, provides service to other nodes. Because each new node contributes resources, the capacity of the system grows as the demand increases, resulting in limitless system scalability. With cooperation, the source of the file, i.e. the server, does not need to increase its resources to accommodate the larger user population; this, also, provides resilience to "flash crowds"—a huge and sudden surge of traffic that usually leads to the collapse of the affected server. Therefore, end-system cooperative solutions can be used to efficiently and quickly deliver software updates, critical patches, videos, and other large files to a very large number of users while keeping the cost at the original server low.

The present invention is concerned with, but in no way limited to, ways in which network topology management and/or cloud shape management can be used to affect performance of peer-to-peer content distribution.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A topology management process is implemented in peer-to-peer content distribution clouds using tracker nodes. Tracker nodes have information about available peers and assist peers in finding other peers to connect to. Various algorithms for use at the tracker nodes are described for selecting which peers to return as potentials for forming connections to. In addition, architectures and algorithms to allow efficient scaling of tracker nodes in peer-to-peer clouds are described.

An example provides a method of controlling the shape of a peer-to-peer content distribution cloud comprising at least one tracker node and a plurality of peer nodes. The example method comprises the steps of, at the tracker node:
  receiving a request from one of the peer nodes requesting information about one or more other peer nodes to connect to;
  accessing information about a plurality of available peer nodes associated with the tracker node;
  selecting one or more of the available peer nodes on the basis of one or more criteria and on the basis of the accessed information;
  sending information about the selected available peer nodes to the requesting peer node.

This provides the advantage that the tracker node can be used to control the shape of the cloud in a simple and effective manner. Intelligence is incorporated at the tracker node comprising the criteria and ways in which the criteria are used in conjunction with the accessed information to filter available peers. The term "peer nodes associated with" the tracker node is used to refer to any peer nodes which are known to the tracker node, for example, as a result of having registered with the tracker node, or as a result of any other suitable process. Thus the requesting peer node is not necessarily associated with the tracker node. A peer node making such request need not have already registered with the tracker node. The term "available peer nodes associated with the tracker node" is used to refer to any of the peer nodes associated with the tracker node which can be selected by the tracker node.

A corresponding tracker node is described in another example. The example tracker node is for controlling the shape of a peer-to-peer content distribution cloud comprising a plurality of peer nodes. The tracker node comprises:
  an input arranged to receive a request from one of the peer nodes requesting information about one or more other peer nodes to connect to;
  means for accessing information about a plurality of available peer nodes associated with the tracker node;
  a processor arranged to select one or more of the available peer nodes on the basis of one or more criteria and on the basis of the accessed information;
  an output arranged to send information about the selected available peer nodes to the requesting peer node.

Preferably the accessed information comprises information provided by peer nodes during registration with the tracker node. In another embodiment, the accessed information also comprises or only comprises information provided by peer nodes as part of their request for peer nodes to connect to.

Preferably the information provided by peer nodes as part of their request for peer nodes to connect to comprises details of peers that the requesting peer does not want to connect to at present. Other information that may be included in this request comprises the requesting peer node's geographical location, its Internet Protocol address and any other suitable information such as that mentioned in the next paragraph but one.

Preferably said one or more criteria are selected from any of: locality, subscription levels, quality of service levels, relative upload ability, relative download ability, pseudo random selection, relative number of existing peer connections, relative amount of available peer content, historical peer behaviour information, forecast peer behaviour information, relative local resources, relative node accessibility, predicted pairwise connectivity, and opaque metadata. The term "opaque metadata" refers to information which is semantically unknown to the tracker.

Preferably the accessed information comprises one or more of: locality information, subscription information, quality of service information, upload speed information, download speed information, number of existing peer connections, amount of available peer content, historical peer behaviour information, forecast peer behaviour information, local resource information, type of internet address, node accessibility information, predicted pairwise connectivity information, and opaque metadata.

For example, the locality information is selected from one or more of internet protocol addresses, network co-ordinate system information, internet protocol address to geolocation database results, information about whether peers are in a public or a private network region, postal address information, global positioning system information, network locality information and geographical information.

In another example the locality information comprises comparison of internet protocol address prefixes.

Another example provides a computer program comprising computer program code means adapted to perform all the steps of any of the methods described above when said program is run on a computer. That computer program can be embodied on a computer readable medium.

In another example there is described a peer to peer content distribution cloud comprising a plurality of tracker nodes as described above. In an example the peer nodes associated with each tracker node are different and each tracker node is able to access information only about its associated peer nodes. In another example, each peer node is associated with more than one of the tracker nodes. For example, by registering with more than one tracker.

For example, the peer to peer content distribution cloud comprises peer nodes that are arranged to make requests for other peer nodes to connect to from different ones of the tracker nodes.

Those peer nodes are for example arranged to select which tracker node to request other peer details from on any one or more of the following criteria: random selection, select each tracker in turn, select any tracker other than the one previously used, select only from trackers the peer is associated with.

Another example provides a peer node for use in a peer-to-peer content distribution cloud comprising a plurality of tracker nodes as described above, said peer node being arranged to repeatedly change the tracker node from which it requests details of other peer nodes to connect to. In another example, the peer node is arranged to register with more than one of the tracker nodes.

For example, the peer node is arranged to change tracker nodes before making each request for details of other peer nodes to connect to.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "cloud" is used herein to refer to a plurality of nodes in a communications network which have access to a peer-to-peer file sharing protocol and are using that protocol to try to obtain a copy of a particular piece of content such as a file that is being distributed. A cloud is also referred to as a graph in some literature. The nodes in the cloud each have one or more current connections using that protocol to others of the nodes. Thus nodes can join or leave the cloud as they drop or form connections to nodes already in the cloud. The connections need not always be actively used for content distribution although the connections need to be suitable for doing so using the particular protocol, which may or may not use network encoding. The connections can either be one-way or two-way connections. In the particular examples described herein all the connections are one-way such that the clouds are asymmetrical although the invention is applicable to and encompasses symmetrical clouds in which the connections are two-way with single connections supporting traffic in both upload and download directions. Also, a given node can be a member of more than one cloud at a time. For example, a first cloud where nodes are trying to obtain a copy of a video being shared and a second cloud where the nodes are trying to obtain a copy of a portfolio of digital still images. Clouds can be independent of one another or may overlap partially or fully.

Figure 2:
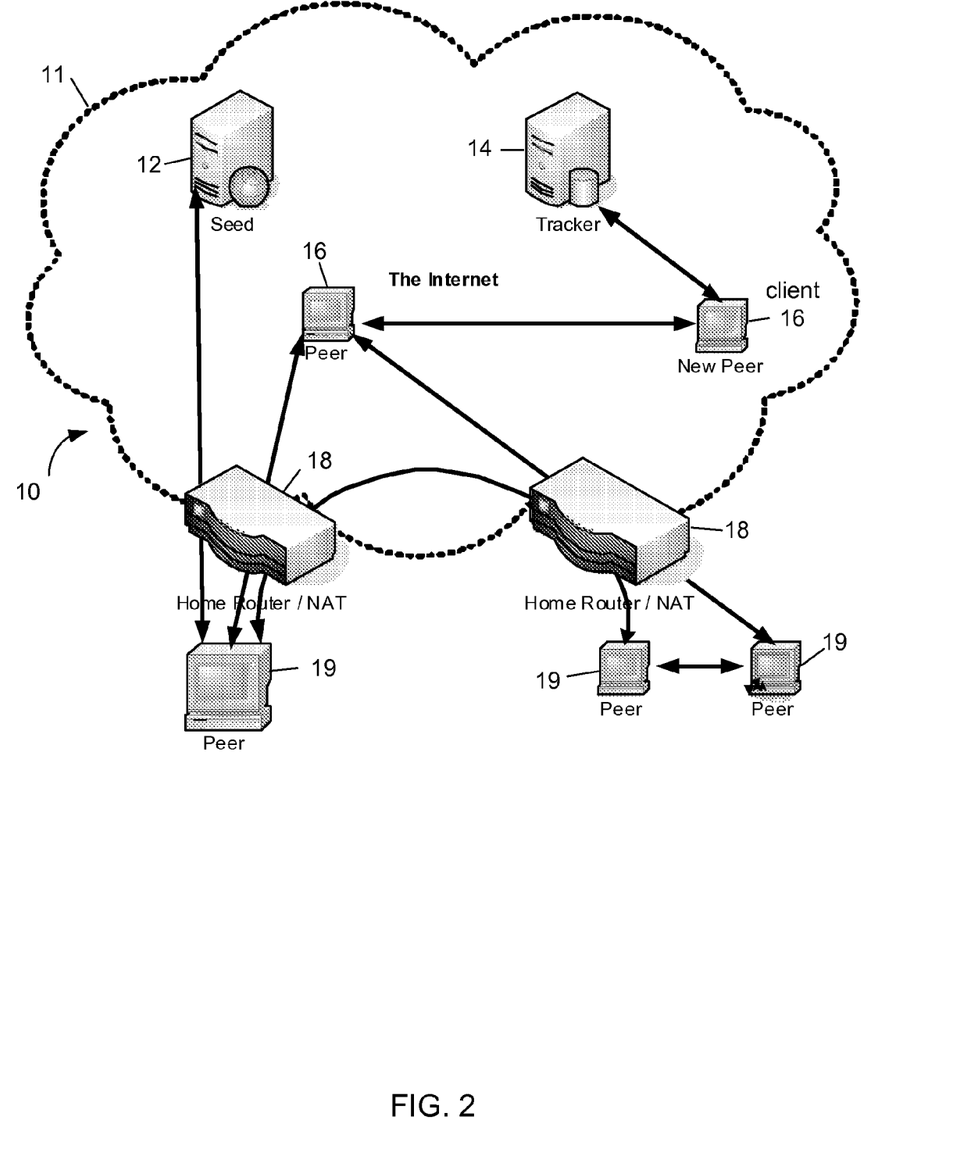
FIG. 2 is a schematic diagram of a peer-to-peer file sharing cloud.

FIG. 2 is a schematic diagram of a peer-to-peer file distribution cloud 10 comprising a plurality of nodes connected via the internet 11 or any other suitable communications network. The cloud itself may comprise many more nodes although for clarity less than ten are illustrated. Also, other nodes may be present connected between or directly to cloud members, although not being peer-to-peer file sharing participants and so not members of the cloud, these are not illustrated.

One or more seed nodes 12 are provided in the cloud 10. A seed node is one from which content, also referred to as files, originates. For example, suppose a company has a product demonstration video which it wishes to share publicly to the cloud members. This file can be placed on a seed node. The seed node is typically "always on" such that content files are available to upload from it for significant periods of time (barring maintenance periods etc.). Generally a seed node is active in uploading content and not downloading content. Only a limited and relatively small number of nodes in the cloud can download content from the seed node simultaneously. The seed node may or may not use the peer-to-peer file sharing protocol to upload the content to other members of the cloud. However, those other members go on to share the content or parts of the content with cloud members using the peer-to-peer file sharing protocol. Thus other cloud members can effectively act as seed nodes for periods of time during which they allow content to be uploaded from themselves but do not actively download content during that time. In some cases, once the seed node 12 has transmitted the content into the cloud, it is possible for the seed node 12 to go offline whilst the cloud 10 still functions.

One or more tracker nodes 14 (also referred to as registrar nodes) are provided in the cloud 10. A tracker node 14 has information about cloud members such as whether a peer is participating in the cloud and has any information to share. This tracker node helps cloud members to find other cloud members which have required content.

A plurality of peer nodes 16, 19, also referred to as clients, are also present in the cloud. A peer node is one which requires the content being shared in the cloud and which may or may not also share parts of that content which it has obtained. A peer node may act as a temporary seed as mentioned above. In the example illustrated in FIG. 1, peer nodes 16 are located in a public network such as the internet whilst peer nodes 19 are located in private enterprise networks or home networks behind a firewall and/or network address translator (NAT) 18.

The term "leech" is used to refer to a peer which downloads but does not upload content; a leech is a parasite taking from the system and giving little or nothing in return. For example, the leech may be a node which downloads content frequently but which provides little or no upload capability to other peer nodes.

The term "loner" is used to refer to an individual node seeking to join a peer-to-peer content distribution cloud but which has not yet formed a minimum number of connections to peers in the cloud.

As described in our earlier European patent application no. 0527099.4 filed on 22 Dec. 2005 we developed a topology management process which involves removing or "tearing down" connections between nodes in certain situations in order to try to replace those connections with more optimal ones. In order to do this we created a number of conditions or rules to be implemented at peer nodes. Many of these rules are preferably, but not essentially, evaluated periodically (such as over a minute) rather than instantly. This helps to prevent unnecessary thrash in the network. Examples of some of these conditions or rules are now given:

Each peer node is provided with a pre-specified maximum number of connections it can form to its neighbours and a pre-specified minimum number of those connections. A neighbour node is one to which a direct connection is formed in a single logical "hop". That is nodes that are indirectly connected are not considered as neighbours for the purposes of this document. For example, the minimum number of connections a peer node must have in order to participate in the cloud can be about 4. The maximum number of connections a peer node can have in order to remain in the cloud can typically be on the order of 10s.

If any node has been idle for more than a specified threshold time period, or waiting for a notification for more than a specified threshold time period, then disconnect.

If as a result of a disconnect or otherwise the number of connections is below the minimum then ask the tracker for peers to connect to.

If any connection is downloading at a rate slower than a specified download rate and there are active downloads at the same node which are as fast or faster, then disconnect.

If any connection is uploading at a rate slower than a specified threshold then disconnect.

If there are download connections idle, and more downloads are needed, request a download on idle connections.

If there are too few active upload or download connections, ask the tracker for more peers to connect to, then connect to them with both upload and download connection requests.

Each node initiates separate connections for uploading and downloading content (in the case that the cloud is asymmetrical).

A node will not initiate or accept download connections if it already has all content local.

A node may increase its upload connection limit if it has all content local.

In addition to idle, downloading and uploading states, we specify a new state in which connections may be referred to as a "notify" state. A notify state occurs if a peer requests a download over a connection but the remote peer has no useful content to offer. It can also occur if a peer requests information from a tracker but the tracker has no new peer information to supply.

If a node at a download side of a connection has more than a specified number of its download connections in a notify state then disconnect one or more of those connections in a notify state.

If a node at an upload side of a connection has more than a specified number of its upload connections in a notify state then disconnect one of those connections.

Allow a connection to wait in "notify" state for longer than it is allowed to remain in an "idle" state.

It is not essential to use all these rules or conditions. That is, one or more of these rules or conditions may be implemented in methods at the peer nodes.

As noted in our earlier European patent application referenced above, a problem that arises as a result of network heterogeneity relates to public and private networks and whether nodes are reachable. For example FIG. 2 shows a public network 11 (the Internet in this case) and two routers or network address translators (NATs) 18. Nodes 19 connected behind the NATs 18 are not reachable by nodes within the public internet 11 unless the owner of the NATS 18 have specifically enabled this, an action which requires networking expertise. For example nodes in a private enterprise network connected behind a NAT 18 typically have unique addresses which are unique within that enterprise network. However, these addresses are not unique within the internet. If a node behind a NAT or firewall 19 has a network address of one of the public nodes 16 it is able to use this to establish a connection with that public node. However the reverse is not necessarily the case. That is, a node 16 in the public internet is unable to form a connection with a node 19 behind a NAT without details of a network address of a port at the NAT at which a required binding has previously been set up. Because of this, private nodes 19 which are part of a peer-to-peer file sharing cloud can find it relatively difficult to obtain content as compared with public nodes. If the proportion of private nodes in the cloud is more than about 50% significant problems arise for peer-to-peer content distribution. In practice we have found that the proportion of private nodes in peer-to-peer content distribution clouds tends to be around 70%. In order to address this issue we therefore weight our network 'chum' algorithm in order to give bias towards dropping public rather than private connections.

In a preferred embodiment of the present invention we use an 'elastic' maximum number of connections which is set at a number of the order of tens but which can be increased in certain circumstances. For example, if more connections are required these can be established for a specified period of time. Similarly, we use an elastic minimum number of connections in some embodiments. For example, in some cases, a node currently housing the minimum number of connections is required to drop one of those as part of the network churn algorithm. The elastic minimum allows that node to remain in the cloud for a specified time despite having too few connections. In a preferred embodiment the elastic minimum is such that an existing peer is considered a member of the cloud until it reaches zero connections.

We have found that the following 'clean up' rules or topology management processes are particularly effective:
- arrange each peer node to carry out a 'clean up' every 60 seconds or after any other suitable time interval
- during that 'clean up' tear down any idle connections which have been idle for about 5 minutes or more and which are not in a notify state; and/or
- during that 'clean up' tear down any connections which have been in a notify state for longer than about 10 minutes or for a time about twice as long as the maximum allowed idle time.

We have found that the following 'network chum' rules or topology management processes are particularly effective:
- obtain information about relative content distribution over each connection at the peer node
- randomly select one of these connections
- drop the selected connection except where the relative content distribution over that connection is the poorest wait for a specified time interval and then repeat this method.

Peer Initialization

When a peer initializes, it must know the network endpoint of a tracker. To initialize for the first time in a cloud, it connects to the tracker and requests a description of the particular file the peer is interested in downloading or sharing. If the client already has this data from a previous session, it checks with the tracker to confirm that the content should still be offered. After obtaining or confirming the file description, the peer is considered initialized.

As long as the peer is active and has at least one block of content to share, it registers itself with the tracker. It must periodically refresh this registration as it will automatically time out. The peer should also de-register with the tracker when it is leaving the cloud.

In addition to obtaining file information and registering with the tracker, a peer may periodically query the tracker to find other peers. This query consists of a request to the tracker, followed by the trackers transmission of 0 or more endpoints to the peer.

Each tracker transaction can be handled over a separately established and maintained connection. The connection lifetime will typically be a single transaction.

Disconnecting from the Cloud

When disconnecting from the cloud, a peer does the following:
- Send a message to the tracker, deleting itself from the list of active participants in the cloud.
- Send a request to close the connection to each neighbour, letting the neighbour know that the node is shutting down.
- Flush each connection (to ensure the disconnect notification is remotely received) and then close the connection.

Tracker Node

As mentioned above tracker nodes 14 (also referred to as registrar nodes) help cloud members to find other cloud members which have content. Active peers are arranged to register with a tracker node and to periodically refresh that registration. For example, a peer can be required to register once a particular criteria is met such as having a specified number of blocks of content to share. A peer may periodically query the tracker with which it is registered in order to find other peers. The present invention, at least in some embodiments, is concerned with ways in which the tracker node can intelligently return peer information in response to such requests, in order to shape the cloud. In this way a cloud "owner" is able to centrally select and implement different cloud shaping mechanisms at the tracker node without requiring any modification to peers.

Figure 3:
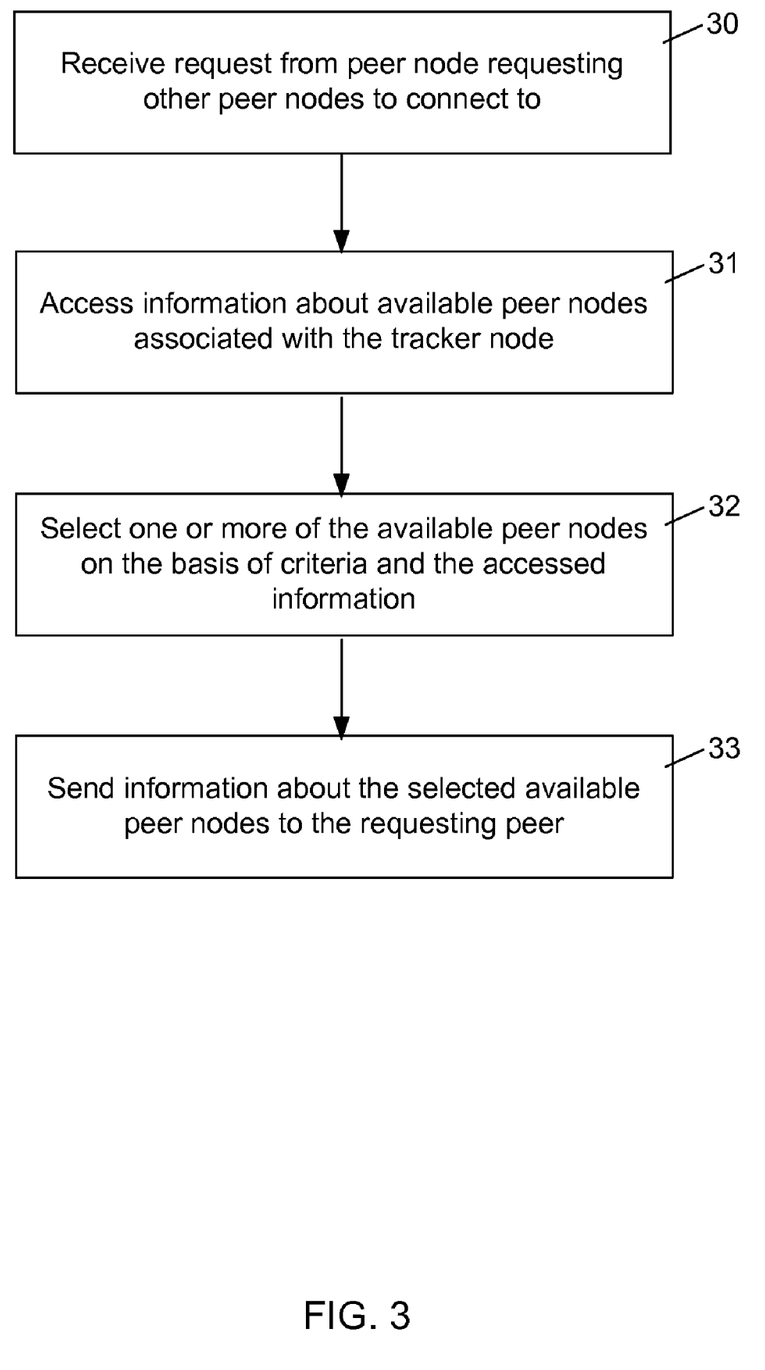
FIG. 3 is a flow diagram of a method of selecting peer nodes.

A general method to be implemented at such a tracker node in order to shape the peer-to-peer cloud is now described with reference to FIG. 3. The tracker node first receives a request (see box 30) from one of the peer nodes requesting information about one or more other peer nodes to connect to. The tracker node accesses information about a plurality of available peer nodes associated with itself (see box 31). For example, all peer nodes that are currently registered with the tracker node are associated with it. The accessed information can be provided during the registration process; or together with the request for nodes to connect to; or in any other suitable manner. For example, it could be stored in a database of topology information held centrally or could be obtained by actively probing the peers.

The tracker node then selects one or more of the available peer nodes on the basis of one or more criteria and on the basis of the accessed information (see box 32). The criteria can be of any suitable type and examples are discussed below. For example, the criteria may be to select peers that are geographically closest to the requesting peer using postal address information supplied by the peers. In the case that peers supply postal address information when they register, a peer that is making a request for information must also provide its postal address in the request. This is because one cannot assume that a peer making a request has registered. The first time a peer requests information about other peers, it often will not have registered yet, because it does not yet have any data blocks to share.

Information about the selected available peer nodes is then sent to the requesting peer node (see box 33). The requesting peer node can use the information to establish new connections to one or more of the selected peers.

Figure 9:
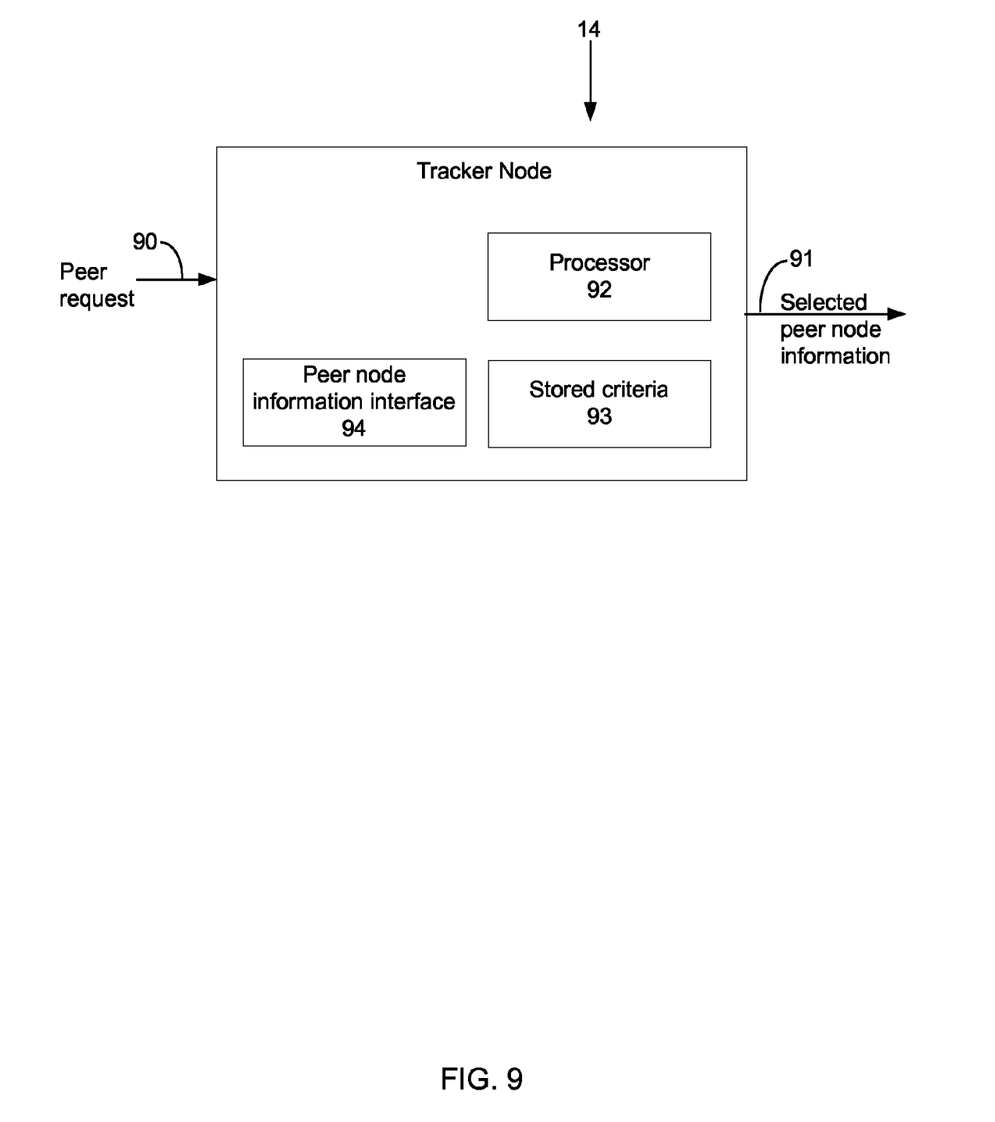
FIG. 9 is a schematic diagram of a tracker node.

FIG. 9 is a schematic diagram of a tracker node (14) in more detail. The tracker node has an input 90 arranged to receive peer requests. It comprises stored criteria 93, or means to access the criteria from another location. A peer node information interface 94 is provided which enables the tracker node 14 to access information about available peer nodes associated with the tracker node. That information can be stored at the tracker node itself or elsewhere. A processor 92 is provided to select one or more of the available peer nodes as mentioned above. An output 91 allows the information about the selected peer nodes to be sent to the requesting peer.

Accessed Information

The accessed information that the tracker node uses to select peers is preferably stored in a database at the tracker node itself. Alternatively it can be accessed from other entities connected to the tracker node, either within the cloud or outside the cloud. In some embodiments the accessed information can be provided by peer nodes during registration with the tracker node. This type of information is referred to herein as metadata. For example, the registration process involves sending a packet of information to the tracker node using a message protocol. That packet has a pre-specified structure comprising a payload or other part in which metadata can be carried. In that case, the peer node is arranged to insert the metadata into the payload or other suitable structure in the packet in a pre-specified manner such that, at least in some embodiments, it can be interpreted at the tracker node. (In the case that opaque metadata is used this is not interpreted at the tracker node but is simply extracted.) The metadata can comprise any suitable information about behaviour at the peer node or other information associated with the peer node. The accessed information can also be provided by peer nodes as part of their request for peer nodes to connect to. For example, such requests preferably comprise identity or address information of the requesting peer node and information about peer nodes that it is not required to connect to. For example, because the requesting peer node is already connected to those nodes, or because the requesting peer already knows it cannot (or does not wish to) connect to those nodes. In a preferred embodiment we use two different unrelated data structures to represent the metadata and the list of nodes that it is not required to connect to. However, this is not essential, any suitable types of data structures can be used.

In some embodiments opaque metadata is used, that is, metadata which is not interpreted by the tracker and which the tracker does not know the meaning of. In such embodiments the tracker knows that the metadata items are to be used for peer selection but does not gain any other meaning from those metadata items. Use of opaque metadata is explained in more detail later.

Examples of accessed information used for the selection of peers is now listed:
- locality information,
- subscription information,
- quality of service information,
- upload speed information,
- download speed information,
- number of existing peer connections,
- amount of available peer content,
- historical peer behaviour information,
- forecast peer behaviour information,
- local resource information,
- type of internet address,
- node accessibility (e.g. whether behind a NAT or firewall),
- predicted pairwise connectivity.

Locality information comprises any information about relative network position, or geographical position of a peer. It can also comprise information about the type of network region that the peer is in, be it a public or private network as mentioned above with reference to FIG. 2. The terms "reachable" and "unreachable" are also used herein to refer to whether a peer node is in a public network and is "reachable" by other public nodes or in a private network and is "unreachable" by direct contact from nodes in a public network region.

For example, the locality information can comprise information about internet protocol addresses of the peer nodes. A comparison can be made of internet protocol address prefixes to select peers having the longest pre-fix match to the internet protocol (IP) address of the requesting peer. In the case of IPV6 networks, the address prefix similarity gives a good indication that the entities having the addresses are relatively close together in the network, if not also in geographical location. That applies at least for top level aggregator (TLA)/second level aggregator (SLA)/network level aggregator (NLA) breakpoints in the address space. However, this is not always the case when IPv4 addresses are used. In that case the same method can be used and gives a working solution although in some cases entities with similar IPv4 addresses may actually be far apart in the network and/or in geographical location.

An example of a suitable algorithm for use at a tracker node to implement the IP address comparison method is now given. The tracker node compares all public IP addresses of the requesting peer to all public addresses of each peer endpoint registered at the tracker node. The tracker node returns the peer endpoints for peers whose public addresses have the longest prefix match to the requestor's address. For example, if Z has address 1.2.3.4, A has address 1.2.5.6, and B has address 1.2.3.7, the tracker node would prefer to return B to a peer request issued by Z. B matches three bytes of the prefix (1.2.3), while A only matches two bytes of the prefix (1.2).

The locality information can also comprise information from a network co-ordinate system such as Global Network Positioning (GNP), Practical Internet Co-ordinates (PIC), Lighthouses, and Principal Component Analysis (PCA)-based techniques including Virtual Landmark and ICS. Any other suitable network co-ordinate system can be used. In general terms all these network co-ordinate systems select a subset of network nodes as being reference points and create an origin for a co-ordinate system. Round-trip-time is measured between the reference point nodes and coordinates for each reference point node are calculated on the basis of those round trip time results. To determine co-ordinates for another node in the network the round trip time between it and the reference point nodes are calculated and on the basis of this co-ordinates are determined. The various different network co-ordinate systems mentioned above use different techniques for selecting the reference points, creating the origin, and calculating the co-ordinates.

Another option is to use internet protocol address to geolocation database results to provide the locality information. Such databases are currently commercially available and can be used to assess relative geographic closeness of entities having internet protocol addresses.

Postal address information or global positioning system information can also be used. For example, the requesting peer node accesses this information and provides it as metadata when it registers with the tracker node, or provides it as part of its request to the tracker node for more peers to connect to.

Information about whether peers are in a public or a private network region can also be used. To enable good network performance the tracker node is preferably arranged to return reachable peers to a request from an unreachable peer. Note that a reachable peer is one which can accept a connection from a host on the global internet, and an unreachable peer is one which cannot accept a connection, such as a host behind a firewall or a network address translator (NAT). If the tracker node has sufficient information it can determine reachability and even make exceptions for peers behind the same firewall or NAT as the requesting peer.

Figure 4:
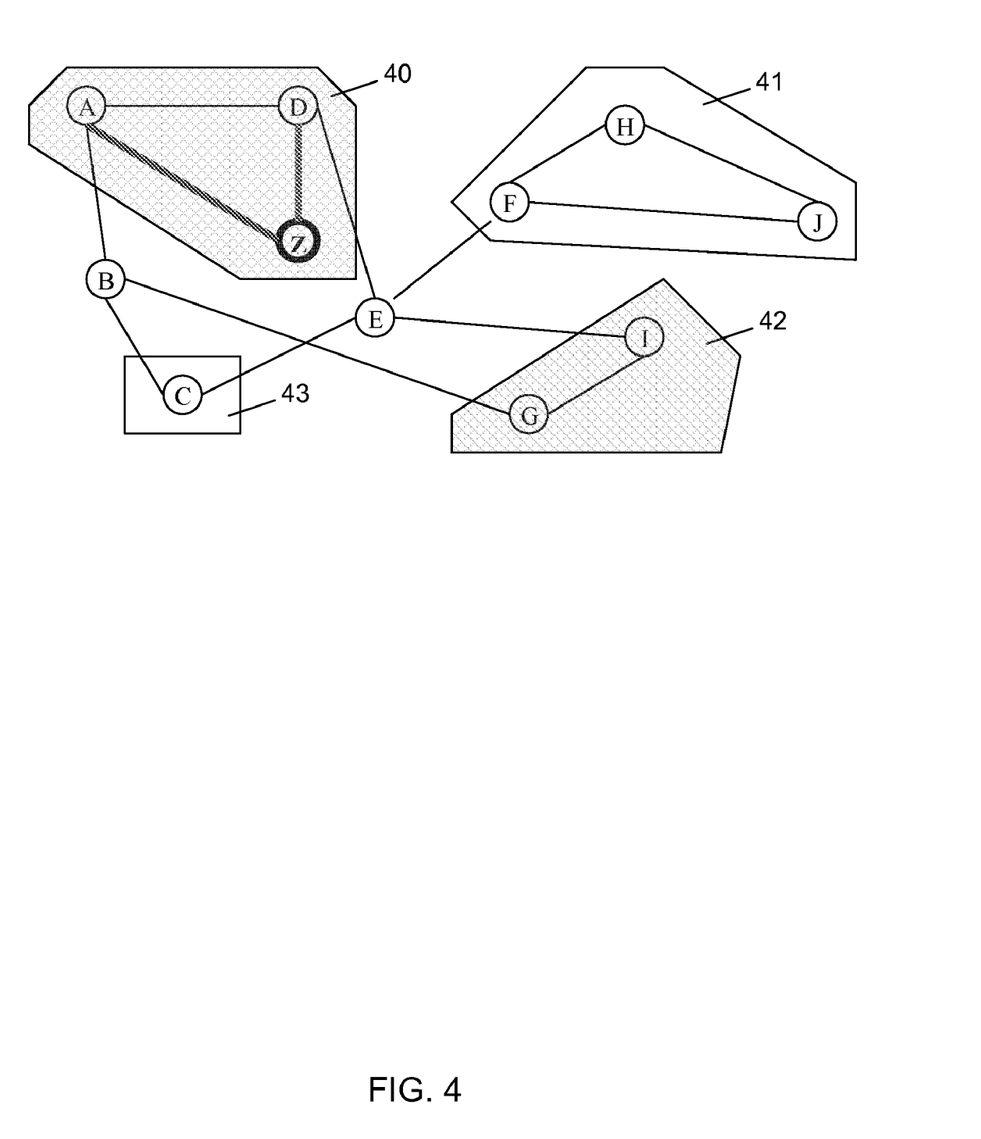
FIG. 4 is a schematic diagram of a peer-to-peer cloud with network regions.

With reference to FIG. 4 a peer-to-peer content distribution cloud is represented having four network regions 40, 41, 42, 43 which might be for example intranets at particular enterprises or other organizations. Two of the network regions are cross-hatched 40, 42 indicating that these are behind a firewall or NAT or are otherwise unreachable from the public network. Peers in the unreachable regions can initiate outbound connections, and can initiate connections to each other, but cannot receive connection requests from outside the boundary. In one embodiment the tracker is arranged to prefer peers within a boundary to be well connected, and that each region have relatively few connections crossing boundaries. Nodes within a network boundary usually have better network connectivity (in terms of throughput) to each other than to nodes across the boundary. We have found this pattern allows maximum rate for content propagation in the cloud.

The locality information can also comprise information about legal jurisdictions or countries that a node is located in. This information can then be used by the tracker node to return potential neighbours which meet particular legal jurisdiction requirements or country requirements. Another option is for the tracker node to refuse to request registration from peer nodes which do not meet particular legal jurisdiction, country or other requirements.

It is also possible for subscription information and/or quality of service information to be provided. For example, peers may be required to pay for different levels of service as members of the cloud and in this case, peers with higher levels of service would be given preferential treatment by the tracker node.

Upload speed and/or download speed information about individual peers can also be used by the tracker. For example, to preferentially return information about peers with high upload speeds.

Information about the number of existing peer connections can also be used by the tracker node. For example, peers with few existing connections could preferentially be returned to requesters in order to speed up distribution through the cloud.

Information about the amount of available peer content could be used by the tracker node. In this case the tracker node could preferentially return information about peers with high levels of available content to requesters.

In addition, historical and/or forecast information about peer behaviour can be used by tracker nodes in any suitable manner.

Criteria

Any suitable criteria can be used such as those based on any one or more of:

locality, subscription levels, quality of service levels, relative upload ability, relative download ability, pseudo random selection, relative number of existing peer connections, relative amount of available peer content, historical peer behaviour information, forecast peer behaviour information, relative local resources, relative node accessibility, predicted pairwise connectivity, and opaque metadata.

By using pseudo random selection, random shaping of the cloud is promoted. This gives robustness and relatively predicable average performance.

In the case that opaque metadata is used one of the criteria that the tracker uses for the peer selection is how many of the opaque metadata items in the request match the metadata items provided by other peers during registrations. Peers that have a high number of matches are more likely to be selected by the tracker.

Figure 5:
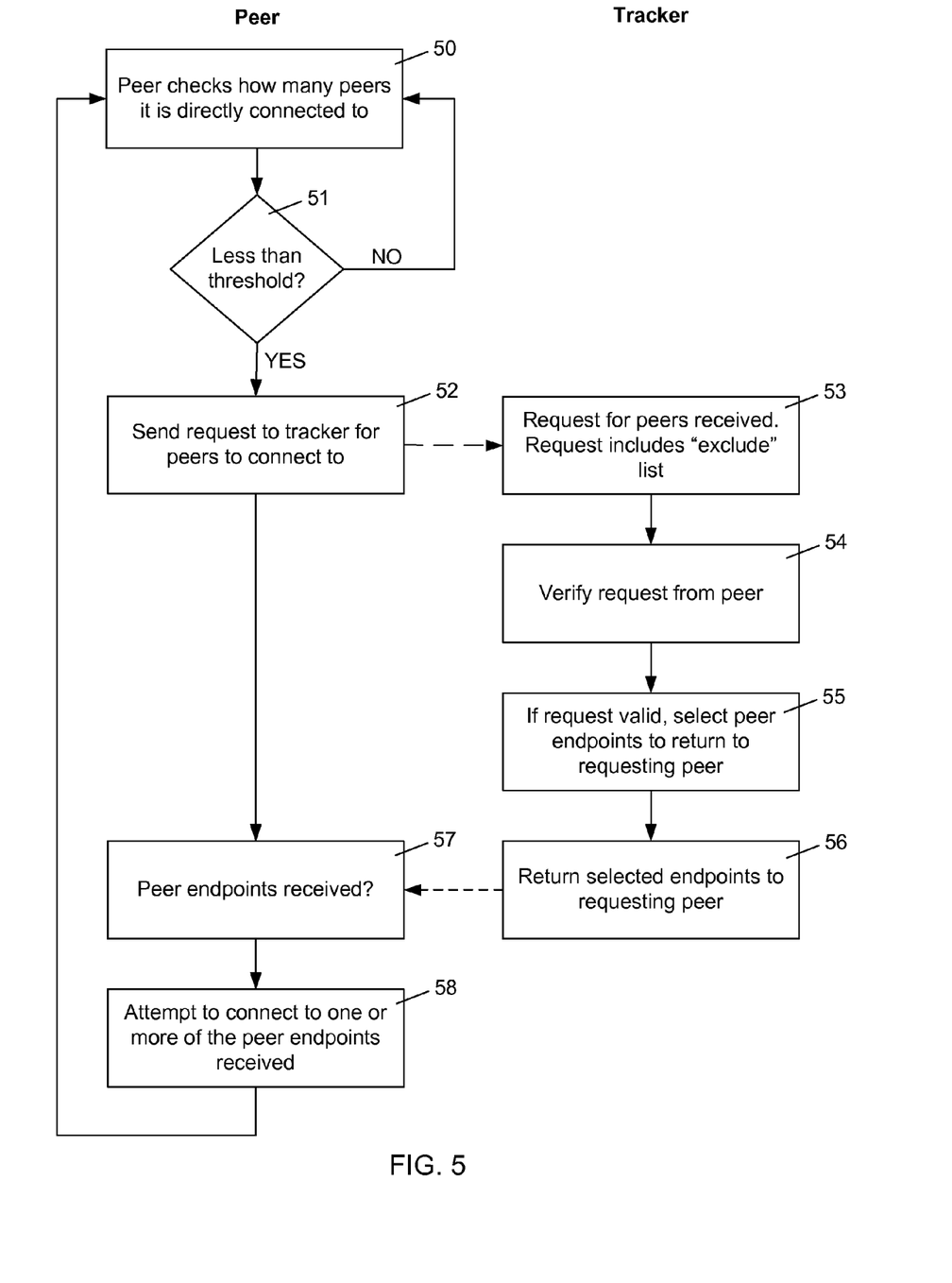
FIG. 5 is a flow diagram of a topology management process.

FIG. 5 is a flow diagram of an example of an interaction between a tracker node and a peer. The peer checks to see how many neighbour peers it is directly connected to (box 50) and if it has less than some threshold number (such as 6 or any other suitable number) (see box 51) it requests peer endpoints from the tracker (see box 52) sufficient to allow it to reach the maximum number of neighbours it is allowed. For example, if the peer has four neighbours and is allowed to have a maximum of 12 neighbours, it would request 8 peer endpoints from the tracker.

The request is received at the tracker (see box 53) and the request preferably, but not essentially, comprises an "exclude" list of peer IDs. This exclude list comprises the IDs of the requesting peer's current neighbours and any other peers which would not be useful to have the tracker return, such as peers the requesting peer has blacklisted or already knows it cannot connect to.

The tracker verifies the request from the peer (see box 54). If the request is valid, it chooses a set of peer endpoints to return to the requestor, ensuring the list does not include any entries on the requestor's exclude list (see box 55). The tracker returns the list of peer endpoints to the requestor (see box 56). The requesting peer then receives the information (see box 57) and attempts to connect to each of the peer endpoints received (see box 58). After a suitable interval (such as 5 minutes or any other suitable time) the method repeats.

For particularly large peer-to-peer content distribution clouds it is required to scale the tracker node. Two approaches to scaling the tracker node are now discussed with reference to FIGS. 6 and 7.

Figure 6:
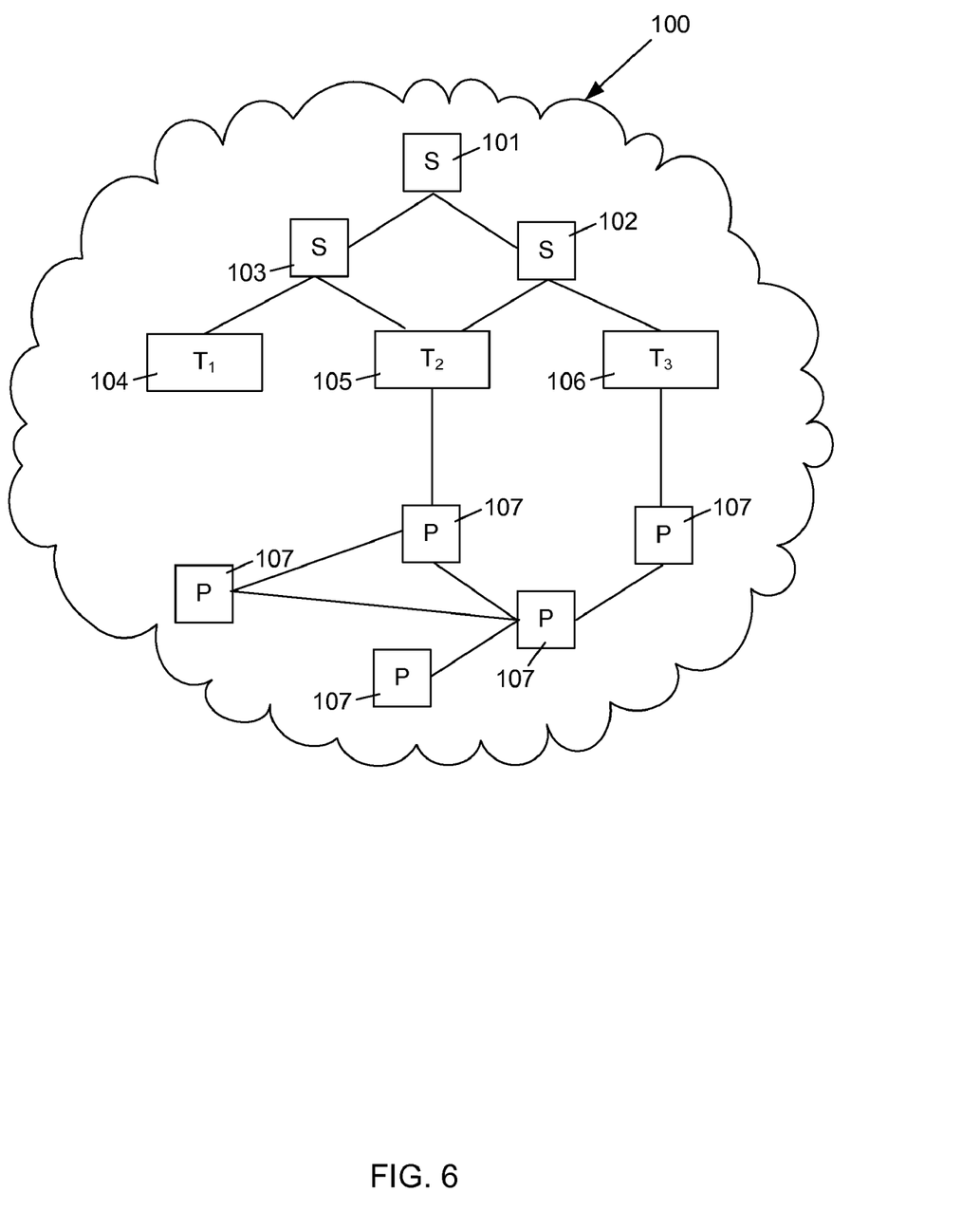
FIG. 6 is a schematic diagram of a peer-to-peer cloud with a plurality of tracker nodes with data mirroring.

FIG. 6 is a schematic diagram of a peer-to-peer content distribution cloud 100 comprising a plurality of peer nodes 107 and a plurality of tracker nodes T (104, 105 and 106). Each tracker node T performs the same function as the tracker nodes described above and is able to support a large but limited number of peer nodes P. In order to support more peer nodes it is possible to add additional tracker nodes T as illustrated in FIG. 6.

Figure 7:
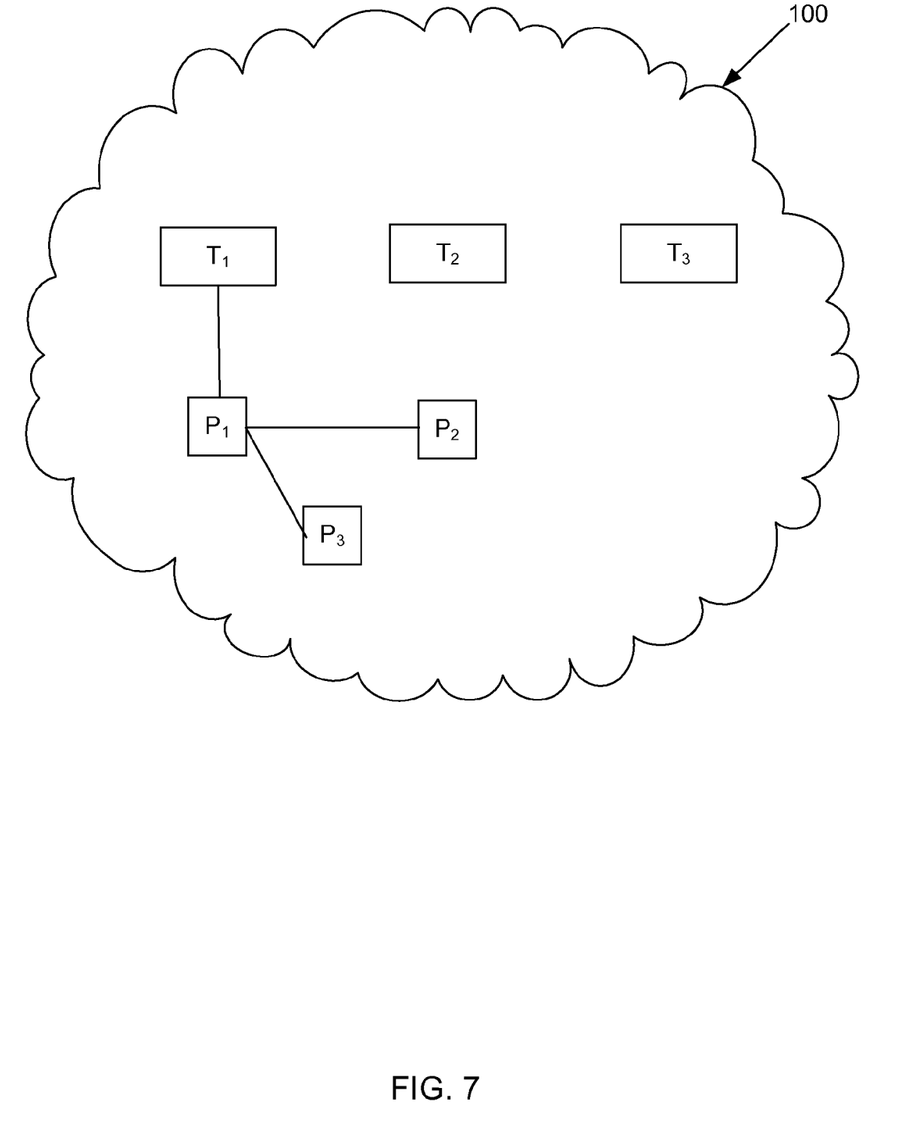
FIG. 7 is a schematic diagram of a peer-to-peer cloud with a plurality of tracker nodes without data mirroring.

In the case that more than one tracker node is used one option is to share peer information between each tracker node such that those tracker nodes always have the same peer information as each other. In order to achieve this it is possible to use one or more servers 101, 102 103 connected between the tracker nodes in order to provide enough processing power to ensure mirroring of data between the tracker nodes. This approach, whilst workable, is expensive because server nodes 101, 102, 103 need to be provided and maintained. An advantage of this approach is that a peer node need only ever request information about other peer nodes to connect to from one specific one of the tracker nodes. If mirroring of data between the tracker nodes is unavailable, then, with peer nodes only ever connecting to one particular tracker node, performance is reduced. That is, one particular tracker node only knows about a subset of the available peers and so it can prevent content from being distributed as rapidly as it might otherwise have been. We recognize this problem and provide an effective and inexpensive solution. This is achieved by ensuring that peer nodes obtain the address of all the available tracker nodes and use a different tracker node each time they make a request for peers to connect to. In this case no additional server nodes S are required to mirror data between the tracker nodes 104, 105, 106. FIG. 7 illustrates this situation in conjunction with the flow diagram of FIG. 8.

Suppose peer node $P_1$ wishes to join the cloud 100. It first obtains information about an address of at least one of the tracker nodes (say T1 for example) and also a content ID for the content required to be obtained during the content distribution process. $P_1$ might obtain this information from a website having a URL with the information or in any other suitable way. The peer node sends a request to the tracker node to be verified and the content ID authenticated (see box 80 of FIG. 8). The peer node requires information about other peer nodes to connect to and receives this information from the tracker node (for example, it is informed about P2 and P3) (see box 81 of FIG. 8). It forms connections with one or more of those peer nodes and begins to access data blocks of the content being distributed (see box 82 of FIG. 8).

Figure 8:
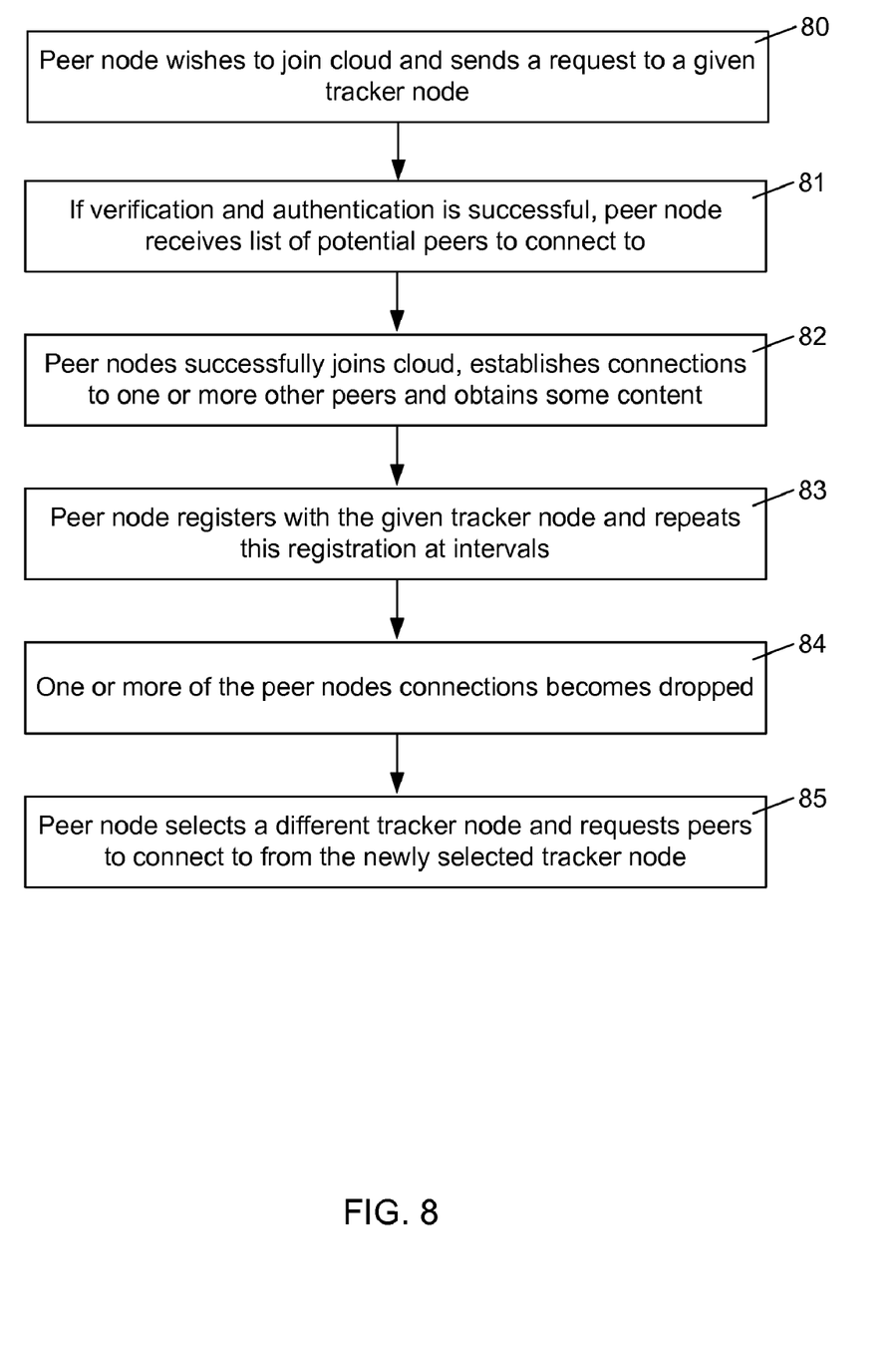
FIG. 8 is a flow diagram of a method at a peer node.

Once the peer node has at least one block of content to share it is arranged to register with its associated tracker node (see box 83 of FIG. 8). During the registration process it provides its address, content ID and any other suitable metadata. The peer node is informed of the frequency with which it should repeatedly inform the tracker node of its presence by registering repeatedly. For example, this might be every 5 minutes or other suitable time. This process is provided to ensure that the tracker node's list of available peer nodes is up to date.

As part our topology management process each peer node is arranged to drop one or more connections to other peer nodes under various circumstances as described above (see box 84 of FIG. 8). In that event, the peer node may need to request details of more peers to connect to. The peer node is arranged to select a different one of the available tracker nodes to do this. That tracker node will have information about different available peer nodes. The peer node then sends its requests for new nodes to connect to, to T2 for example. This process repeats so that when the peer needs to make a new request for nodes to connect to it does so by first selecting a different tracker node to send the request to (see box 85 of FIG. 8). The peer node preferably stays registered with the same tracker throughout a session but will usually form connections to a new tracker each time it needs to request new peers to connect to.

In another embodiment, a plurality of tracker nodes are provided as in FIG. 6 without data mirroring between these tracker nodes. In this embodiment peer nodes are arranged to register with more than one of the tracker nodes. This provides some sharing of peer information between tracker nodes and in this case it is possible for peer nodes to request information about other peers to connect to only from one tracker, or only from any of the trackers with which it is registered. In the case that all the peers register with all the trackers, data mirroring is not required since all trackers know about all peers.

In the case of a relatively small cloud with multiple trackers, special considerations may apply as now described. Assuming that each peer only registers with one tracker, and that tracker is chosen at random, if the cloud is large then each tracker will have an equally good randomly distributed selection of registered peers to choose from. This is due to the law of large numbers. So, when a client sends a request for information about peers, it doesn't matter which tracker it sends the request to. However, if the cloud is small, this may no longer be true. For a given requesting peer, some trackers may have much better information than others. One way to mitigate this (as already described) is to have the peer send each new request for peers to a different tracker. New requests would be sent once every 5 minutes, or so. As time lapses, the requesting peer is more and more likely to get information about good peers.

An alternate solution to this problem is to have the tracker inform the requesting peer if it the list of peers that it returns is from a statistically significant set of registered peers. If the tracker tells the requesting peer that the information comes from a small set of registered peers, then the requesting peer may take that as a prompt that it should send another request for information to a different tracker. This can be done without waiting several minutes to send another request, and this allows the requesting peer to find a good set peers more quickly.

In some embodiments of the invention the peer-to-peer content distribution algorithm uses network coding although this is not essential. The principle behind network coding is to allow peers to encode packets as opposed to server coding where only the server or seed nodes encode packets. Using network coding, every time a peer node needs to upload a packet to another peer, the source peer generates and sends a linear combination of all the information available to it. After a peer receives enough linearly independent combinations of packets it can reconstruct the original information. Using network coding, peer nodes in the cloud are likely to have at least parts of blocks of content which are not present at other neighbouring nodes. Parts of content are 'spread' through the cloud such that a newly established connection is likely to yield at least some useful content as opposed to distribution algorithms which do not use network coding. In the present invention there are some methods which are particularly advantageous when network coding is used. For example, the network churn algorithms can be arranged to drop connections even when the minimum number of connections will not then be realised. This is because it is relatively easy for a node to find a new useful connection as opposed to situations where no network coding is used.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method of controlling the shape of a peer-to-peer content distribution cloud, the method comprising: under control of at least one tracker node in communication with a plurality of peer nodes, the method comprising the acts of, at the tracker node:
   (i) receiving a request from one of the peer nodes requesting information about one or more other peer nodes to connect to, the request comprising:
   details of peer nodes that the requesting peer node does not want to connect to; and
   opaque metadata that is semantically unknown to the tracker node and including items of information about a behaviour at the requesting peer node;
   (ii) accessing information about a plurality of available peer nodes associated with the tracker node, the accessed information comprising: details of the peer nodes that the requesting peer node does not want to connect to; and one or more of: quality of service information, upload speed information, download speed information, number of existing peer connections, and opaque metadata that is semantically unknown to the tracker node, and including items of information about a behaviour at at least one of the plurality of available peer nodes,
   (iii) selecting one or more of the available peer nodes on the basis of one or more criteria, the criteria including quality of service levels, relative upload ability, relative download ability, and/or relative number of existing peer connections; and on the basis of the accessed information; wherein the selecting comprises determining, at the tracker node, how many of the opaque metadata items at the requesting peer node match opaque metadata items provided by peer nodes during registration; and
   (iv) sending information about the selected available peer nodes to the requesting peer node.

2. A method as claimed in claim 1 wherein the accessed information comprises information provided by peer nodes during registration with the tracker and/or information provided by the requesting peer node.

3. A method as claimed in claim 1 wherein the one or more criteria further include locality, subscription levels, pseudo random selection, historical peer behaviour information, forecast peer behaviour information, relative local resources, relative node accessibility, and predicted pairwise connectivity.

4. A method as claimed in claim 1 wherein the accessed information further comprises one or more of: locality information, subscription information, historical peer behaviour information, and forecast peer behaviour information, local resource information, type of internet address, node accessibility information, and predicted pairwise connectivity information.

5. A method as claimed in claim 4 wherein the locality information is selected from one or more of internet protocol addresses, network co-ordinate system information, internet protocol address to geolocation database results, information about whether peers are in a public or a private network region, postal address information, global positioning system information.

6. A method as claimed in claim 5 wherein the locality information comprises comparison of internet protocol address prefixes.

7. A computer program comprising computer-executable instructions embodied on a computer readable storage device, when executed by one or more processors, perform the method of claim 1.

8. A method as claimed in claim 1 further comprising:
   (v) sending, to the requesting peer node, information about a frequency with which the requesting peer node should repeatedly inform the at least one tracker node of a presence of the requesting peer node.

9. A tracker node for controlling the shape of a peer-to-peer content distribution cloud comprising a plurality of peer nodes, the tracker node comprising:
   (i) an input arranged to receive a request from one of the peer nodes requesting information about one or more other peer nodes to connect to, the request comprising:
   details of peer nodes that the requesting peer node does not want to connect to; and
   opaque metadata that is semantically unknown to the tracker node and including items of information about a behaviour at the requesting peer node;
   (ii) a peer node information interface for accessing information about a plurality of available peer nodes associated with the tracker node, the accessed information comprising: details of the peer nodes that the requesting peer node does not want to connect to; and one or more of: quality of service information, upload speed information, download speed information, number of existing peer connections, and opaque metadata that is semantically unknown to the tracker node, and including items of information about a behaviour at at least one of the plurality of available peer nodes,
   (iii) a processor arranged to select one or more of the available peer nodes on the basis of one or more criteria including quality of service levels, relative upload ability, relative download ability, and/or relative number of existing peer connections; and on the basis of the accessed information; the processor arranged such that the selecting comprises determining, at the tracker node, how many of the opaque metadata items at the requesting peer node match opaque metadata items provided by peer nodes during registration; and
   (iv) an output arranged to send information about the selected available peer nodes to the requesting peer node.

10. A tracker node as claimed in claim 9 wherein the accessed information comprises information provided by peer nodes during registration with the tracker and/or information provided by the requesting peer node.

11. A tracker node as claimed in claim 9 wherein the one or more criteria further include locality, subscription levels, pseudo random selection, historical peer behaviour information, forecast peer behaviour information, relative local resources, relative node accessibility, and predicted pairwise connectivity.

12. A tracker node as claimed in claim 9, wherein the accessed information comprises one or more of: locality information, subscription information, historical peer behaviour information, forecast peer behaviour information, local resource information, type of internet address, node accessibility information, and predicted pairwise connectivity information.

13. A tracker node as claimed in claim 12 wherein the locality information is selected from one or more of internet protocol addresses, network co-ordinate system information, internet protocol address to geolocation database results, information about whether peers are in a public or a private network region, postal address information, global positioning system information.

14. A peer to peer content distribution cloud comprising a plurality of tracker nodes, at least one tracker node of the plurality of tracker nodes comprising:
 (i) an input arranged to receive a request from one of the peer nodes requesting information about one or more other peer nodes to connect to, the request comprising:
   details of peer nodes that the requesting peer node does not want to connect to; and
   opaque metadata that is semantically unknown to the tracker node and including items of information about a behaviour at the requesting peer node;
 (ii) a peer node information interface for accessing information about a plurality of available peer nodes associated with the tracker node, the accessed information comprising: details of the peer nodes that the requesting peer node does not want to connect to; and one or more of: quality of service information, upload speed information, download speed information, number of existing peer connections, and opaque metadata that is semantically unknown to the tracker node, and including items of information about a behaviour at at least one of the plurality of available peer nodes;
 (iii) a processor arranged to select one or more of the available peer nodes on the basis of one or more criteria including quality of service levels, relative upload ability, relative download ability, and/or relative number of existing peer connections; and on the basis of the accessed information,
   the processor arranged such that the selecting comprises determining, at the tracker node, how many of the opaque metadata items at the requesting peer node match opaque metadata items provided by peer nodes during registration; and
 (iv) an output arranged to send information about the selected available peer nodes to the requesting peer node.

15. A peer to peer content distribution cloud as claimed in claim 14 wherein the peer nodes associated with each tracker node are different and each tracker node is able to access information only about its associated peer nodes.

16. A peer to peer content distribution cloud as claimed in claim 14 wherein each peer node is associated with more than one of the tracker nodes.

17. A peer to peer content distribution cloud as claimed in claim 14 wherein peer nodes are arranged to make requests for other peer nodes to connect to from different ones of the tracker nodes.

18. A peer to peer content distribution cloud as claimed in claim 17 wherein the peer nodes are arranged to select which tracker node to request other peer details from on any of the following criteria: random selection, select each tracker in turn, select any tracker other than the one previously used, select only from trackers the peer is associated with.

* * * * *